(12) United States Patent
Kato

(10) Patent No.: US 7,579,744 B2
(45) Date of Patent: Aug. 25, 2009

(54) ROTOR STRUCTURE OF AN AXIAL GAP ROTATING ELECTRICAL DEVICE

(75) Inventor: Takashi Kato, Fujisawa (JP)

(73) Assignee: NIssan Motor Co., Ltd., Yokohama (JP)

( * ) Notice: Subject to any disclaimer, the term of this patent is extended or adjusted under 35 U.S.C. 154(b) by 239 days.

(21) Appl. No.: 11/301,634

(22) Filed: Dec. 13, 2005

(65) Prior Publication Data

US 2006/0138890 A1    Jun. 29, 2006

(30) Foreign Application Priority Data

Dec. 14, 2004  (JP)  ............................. 2004-360973

(51) Int. Cl.
*H02K 1/22* (2006.01)

(52) U.S. Cl. .............. 310/268; 310/156.28; 310/156.29

(58) Field of Classification Search ................. 310/268, 310/156.32–156.37, 156.28, 156.29
See application file for complete search history.

(56) References Cited

U.S. PATENT DOCUMENTS

| | | | |
|---|---|---|---|
| 4,488,075 A | | 12/1984 | DeCesare |
| 4,536,672 A | * | 8/1985 | Kanayama et al. .......... 310/268 |
| 4,578,610 A | * | 3/1986 | Kliman et al. ......... 310/156.35 |
| 4,629,920 A | * | 12/1986 | Hermann ............... 310/156.35 |
| 4,792,712 A | * | 12/1988 | Stokes ................... 310/156.21 |
| 4,996,457 A | * | 2/1991 | Hawsey et al. ............. 310/268 |
| 5,216,339 A | * | 6/1993 | Skybyk ....................... 318/254 |
| 5,396,140 A | | 3/1995 | Goldie et al. |
| 5,691,589 A | * | 11/1997 | Keim et al. ............ 310/156.29 |
| 5,838,082 A | * | 11/1998 | Ito et al. .................... 310/90.5 |
| 5,918,360 A | | 7/1999 | Forbes et al. |
| 5,955,808 A | | 9/1999 | Hill |
| 5,986,448 A | | 11/1999 | Yada et al. |
| 6,037,696 A | * | 3/2000 | Sromin et al. ............... 310/268 |
| 6,072,259 A | | 6/2000 | Kawabata et al. |
| 6,445,105 B1 | | 9/2002 | Kliman et al. |
| 6,509,665 B1 | | 1/2003 | Nishiyama et al. |
| 6,531,799 B1 | * | 3/2003 | Miller ......................... 310/114 |
| 6,534,894 B1 | * | 3/2003 | Flowerday .................. 310/268 |
| 6,707,225 B2 | | 3/2004 | Bradfield |
| 6,720,688 B1 | * | 4/2004 | Schiller ........................ 310/64 |
| 6,775,507 B2 | | 8/2004 | Matsuura et al. |
| 6,995,494 B2 | | 2/2006 | Haugan et al. |
| 7,084,548 B1 | * | 8/2006 | Gabrys ........................ 310/268 |
| 2003/0201692 A1 | * | 10/2003 | Chen ........................... 310/268 |

(Continued)

FOREIGN PATENT DOCUMENTS

JP    2004-056860    2/2004

(Continued)

*Primary Examiner*—Quyen Leung
*Assistant Examiner*—Alex W Mok
(74) *Attorney, Agent, or Firm*—Global IP Counselors, LLP

(57) ABSTRACT

An axial gap rotating electrical device includes a stator and a rotor. The stator has a stator core and a stator coil. The rotor is disposed in an axial direction with respect to the stator. The rotor includes a plurality of separate rotor components circumferentially arranged. Each of the rotor components includes a permanent magnet facing the stator core and a high-strength member enveloping an outer surface of the permanent magnet. The high-strength member is configured to prevent a centrifugal force on the permanent magnet from being transmitted between adjacent ones of the high-strength member during a rotation of the rotor.

9 Claims, 9 Drawing Sheets

U.S. PATENT DOCUMENTS

| | | | |
|---|---|---|---|
| 2004/0070307 A1* | 4/2004 | Haugan et al. | 310/268 |
| 2004/0104638 A1 | 6/2004 | Yoneda et al. | |
| 2004/0195933 A1* | 10/2004 | Rose | 310/268 |
| 2005/0017596 A1 | 1/2005 | Naito et al. | |
| 2006/0028093 A1 | 2/2006 | Minagawa et al. | |

FOREIGN PATENT DOCUMENTS

| | | |
|---|---|---|
| JP | 2004-297902 | 10/2004 |
| WO | WO 03/047069 | 6/2003 |

* cited by examiner

US 7,579,744 B2

ROTOR STRUCTURE OF AN AXIAL GAP ROTATING ELECTRICAL DEVICE

This application claims priority from Japanese Patent Application No. 2004-360973, filed Dec. 14, 2004, the entire contents of which is incorporated herein by reference.

TECHNICAL FIELD

The disclosure relates to electricity generation, and more specifically, devices which utilize stators and a rotor to generate electricity.

BACKGROUND

Electric motors that include a permanent magnet attached to a rotor surface have become versatile in expanding the application range of motors to electric vehicles and hybrid cars. These electric motors are beneficial due to the fact that they cause a little loss, are higher in efficiency, and higher in power. Essentially, reluctance torque is available from the motor instead of magnet torque.

An axial gap motor is a permanent magnet synchronous motor in which a stator and a rotor are placed opposite to an axial direction. The axial gap motor may be relatively small in size, and may be used for applications that have space limitations for appropriate motor implementation.

SUMMARY

In general, the invention is directed to a modified rotor of an axial gap motor. Permanent magnets placed within the rotor can produce great stress on members of the rotor that hold the permanent magnets in place radially. Rotor members are typically somewhat curved in shape at the outer contact area with the permanent magnets to distribute stresses during high rotation speed. A round member of the rotor may be constructed of a high-strength member to surround and secure the permanent magnets within the rotor. The round member is formed by combining several radial rotor components, where the rotor components include a high-strength member to circumferentially envelop a permanent magnet.

In one embodiment, an axial gap rotating electrical device comprises a rotor having a permanent magnet and including a round member formed by several radial rotor components and a stator having a stator core and a stator coil, wherein the rotor and the stator are oriented in an axial direction, and the rotor components include the permanent magnet facing the stator core with an outer surface of the permanent magnet radially enveloped by a high-strength member.

In another embodiment, a method comprises forming a round member of a rotor with a plurality of radial rotor components, wherein the rotor includes a permanent magnet and the radial rotor components include a high-strength member that radially envelops the permanent magnet, and rotating the rotor magnet produce electricity.

In an additional embodiment, an axial gap rotating electrical device comprises means for rotating a permanent magnet with respect to a stator and means for securing the permanent magnet radially during the permanent magnet rotation.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
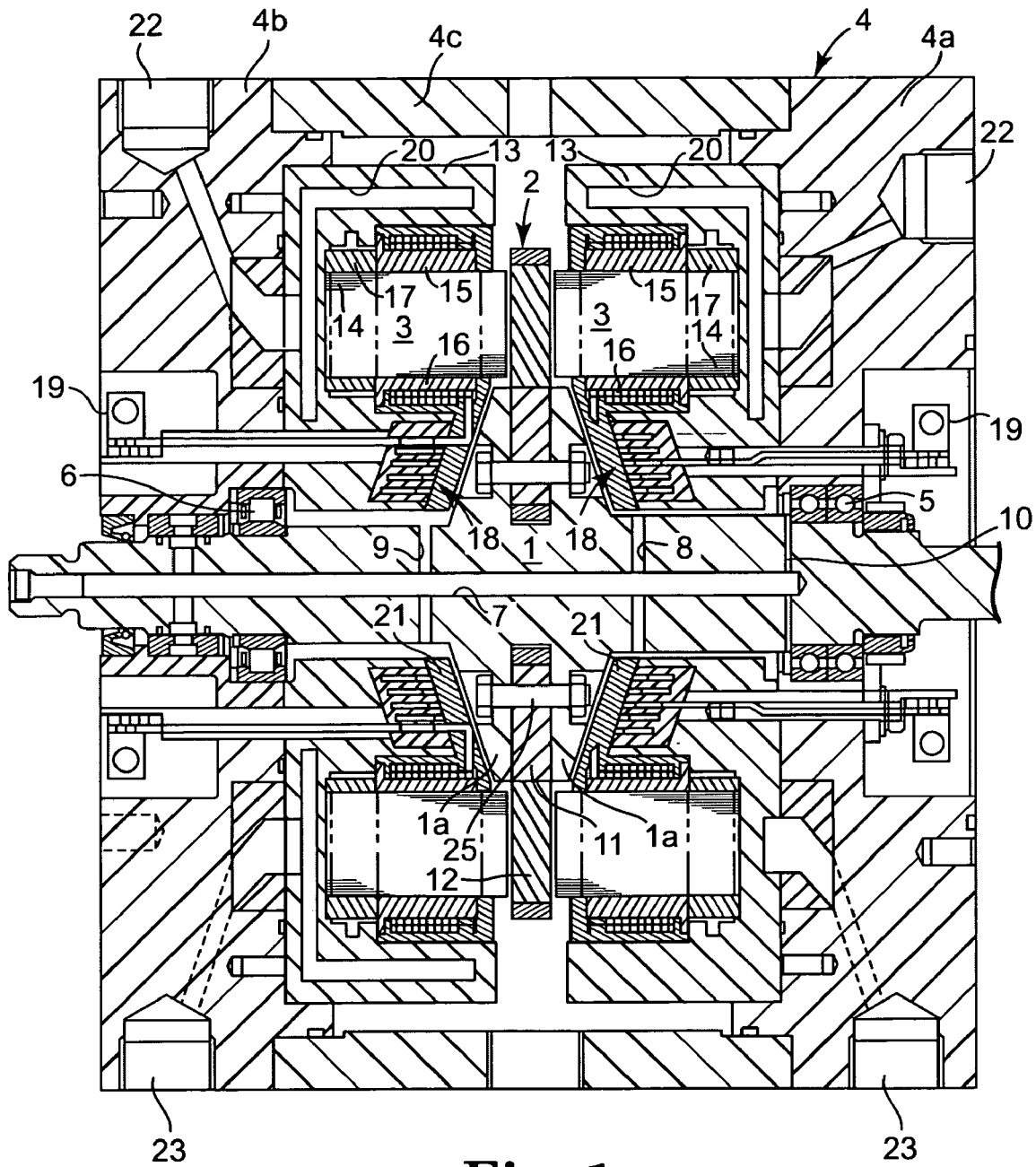
FIG. 1 is an illustration that shows an axial gap rotating electrical device in which a first embodiment of a rotor structure is applied.
Figure 2:
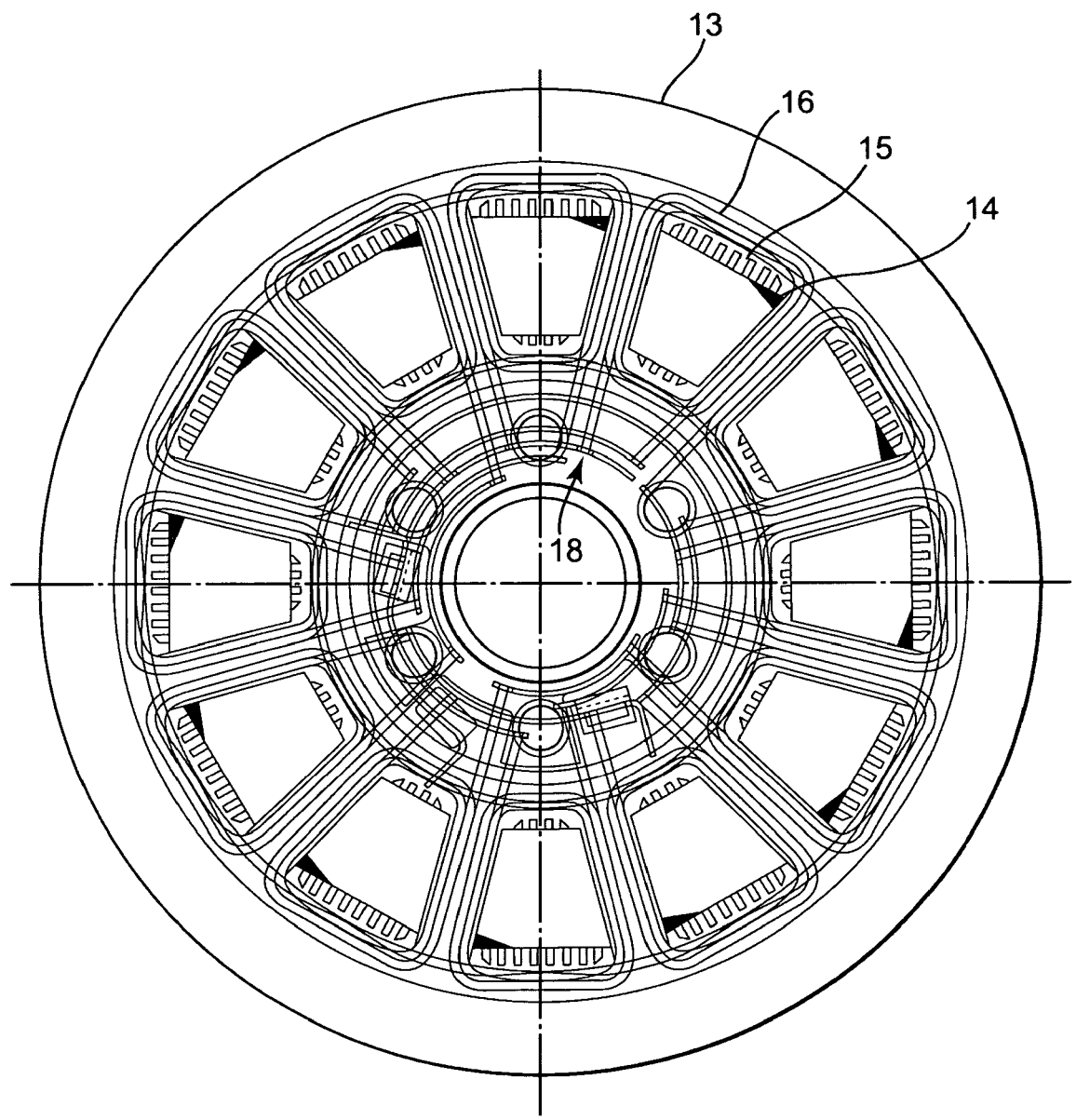
FIG. 2 is an illustration that shows a stator of the first embodiment of the rotor structure of the axial gap electrical device of FIG. 1.

FIG. 1 illustrates a first embodiment 1 rotor and 2 stator-type axial gap rotating electrical device. FIG. 2 shows a front view of the stator of the axial gap rotating electrical device. The axial gap rotating electrical device has rotor axis 1, rotor 2, a pair of stators 3 and rotating electrical device case 4 that is placed opposite to rotor 2 and the pair of stators 3 in the axial direction.

Rotor axis 1 is rotatably held by first bearing 5 placed between rotating electrical device case 4 (front side case 4a) and second bearing 6 placed between rotating electrical device case 4 (rear side case 4b). Rotor axis 1 comprises an axle center oil line 7, a first radial oil line 8 that cools stators 3 at the front side in communication with an axle center oil line 7, a second radial oil line 9 that cools stators 3 at the rear side, a second bearing 6 in communication with said axle center oil line 7, and a third radial oil line 10 that cools first bearing 5 in communication with axle center oil line 7.

Rotor 2 is fixed to rotor axis 1 and is positioned between the pair of stators 3. Rotor 2 consists of several radial rotor components, or radially combined rotor components, which radially envelop the outer circumference of permanent magnet 12 opposite stator core 14 and rotor axis retainer 11. Rotor axis retainer 11 is located radially inward of permanent magnet 12, using a high-strength member 24 (not shown in FIGS. 1 and 2). Permanent magnet 12 is placed such that it produces a reactive force against the rotating flux derived from the pair of stators 3 while rotating around rotor axis 1. Permanent magnets 12 are placed so that the adjacent magnetic poles (North Pole, South Pole) differ from each other. An axial direction gap, referred to as an air gap, exists between rotor 2 and stators 3, preventing them from coming in contact with each other.

Stators 3 are respectively fixed to front side case 4a and rear side case 4b of rotating electrical device case 4, and the fixed positions are positioned on both sides of rotor 2. Stator 3 comprises a stator case 13 bolted to both side cases 4a and 4b.

Stator core 14 is made of laminate steel and stator coil 16 is wound around the stator core 14 via an insulator 15.

As shown in FIG. 2, 12 pieces of stator core 14 with stator coil 16 are arranged equally spaced in a circumferential direction. Besides stator coil 16, stator 3 has core base 17 equipped on the base of stator core 14, a laminated busbar 18, power transmission terminal 19 connected to the laminated busbar, a refrigerants gallery 20 built into stator case 13, and resin mold part 21. Resin mold part 21 fills the gap between stator core 14 with stator coil 16 and laminated busbar 18. Laminated busbar 18 is a power dispatching structure to stator coil 16. For power transmission terminal 19 in a motor mode, a direct current is converted from the battery to a three-phase alternating current via a strong electric unit with an inverter (not shown). The three-phase alternating current is supplied to stator coil 16 via laminated busbar 18. In a generator mode, the three-phase alternating current generated by stator coil 16 is supplied to the strong electric unit with an inverter (not shown), and it is converted to a direct current by the strong electric unit to charge the battery.

Rotating electrical device case 4 comprises a front side case 4a, a rear side case 4b, and an outer circumference case 4c bolted to both side cases 4a and 4b. As shown in FIG. 1, front side case 4a and rear side case 4b comprise a refrigerants supply port 22 to provide the refrigerants gallery with refrigerants (such as a cooling oil) and refrigerants emission port 23 to discharge refrigerants that draw heat from stators 3 in the refrigerants gallery.

Figure 3:
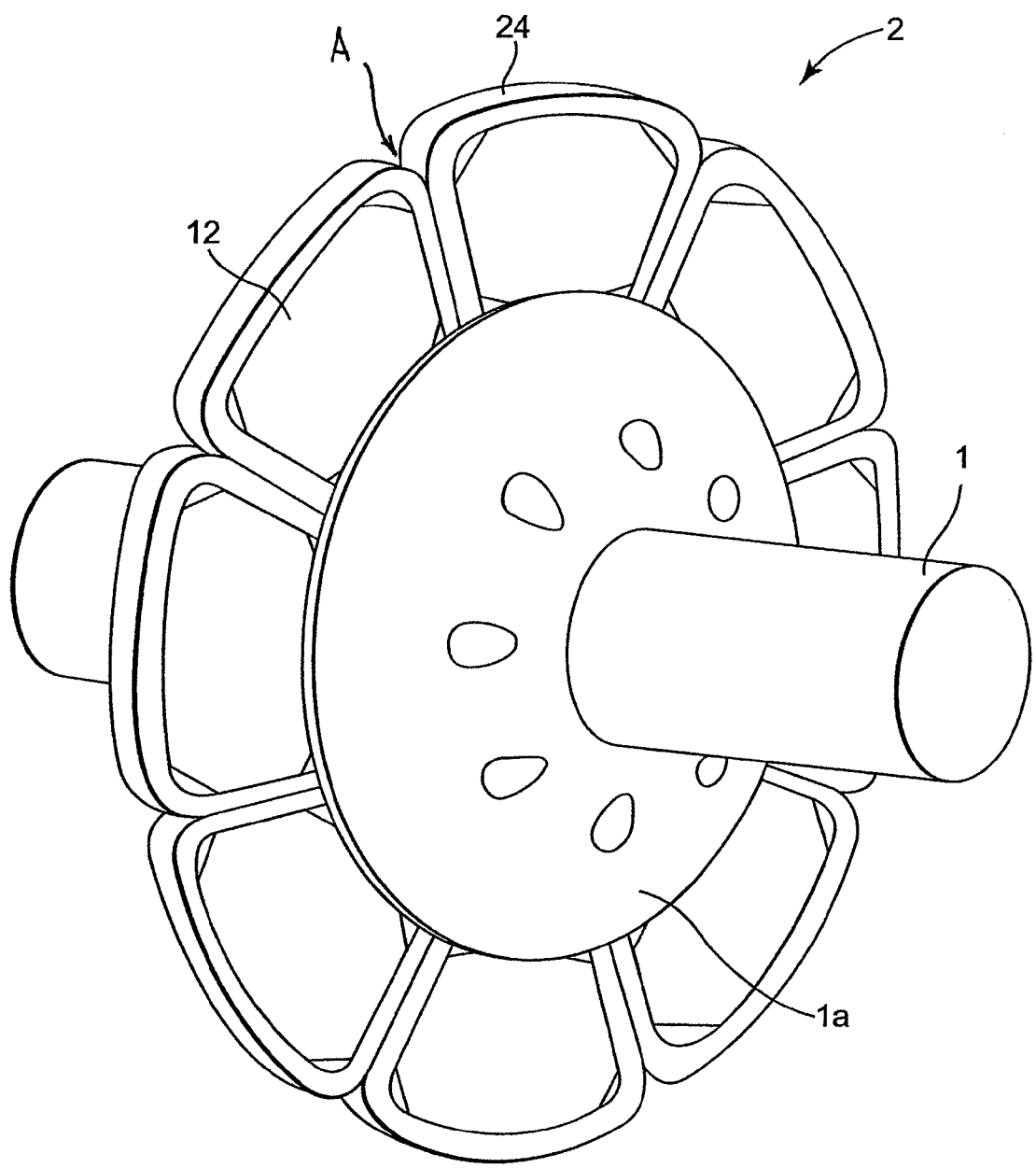
FIG. 3 is a perspective view that shows a rotor axis and a rotor of the axial gap rotating electrical device of FIG. 1.
Figure 4:
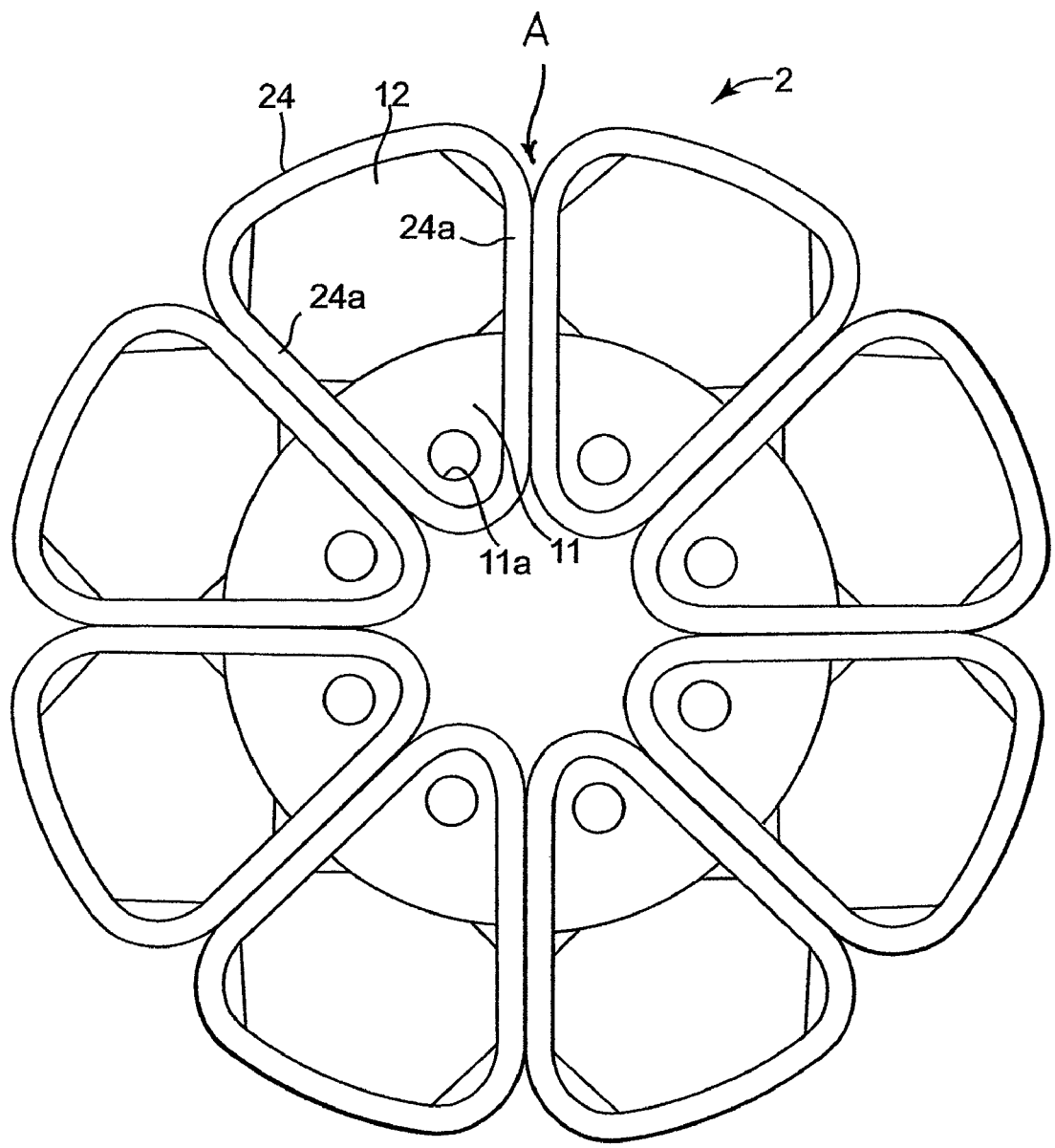
FIG. 4 is a front view of a rotor of the axial gap rotating electrical device of FIG. 1.

FIG. 3 shows a perspective view of the rotor axis and the rotor of the axial gap rotating electrical device. FIG. 4 shows a front view of rotor 2, or the means for rotating permanent magnet 12, of the axial gap rotating electrical device. As shown in FIG. 4, rotor 2 is includes rotor components formed by radially enveloping the outer circumference of permanent magnet 12 with high-strength member 24, or means for securing permanent magnet 12, wherein rotor 2 comprises 1 to 8 combined high strength members to each retain an individual permanent magnet. High strength member 24 is partially circular in shape, but may also be similar to a rounded triangle. Other shapes of member 24 may be appropriate for securing permanent magnet 12 as well.

High-strength member 24 is comprises continuous fiberglass reinforced plastic (such as Carbon-Fiberglass Reinforced Plastics, hereinafter called CFRP) in a shape roughly similar to a folding fan extended into a complete circle.

For rotor axis retainer 11, or means for retaining the means for rotating the permanent magnet, hole 11a is bored for fixing rotor 2 to rotor axis 1, or means for placing the means for rotating the permanent magnet. A pair of reinforced retainers 1a, or means for attaching the means for retaining the means for rotating the permanent magnet, hold rotor axis retainer 11 fixed from both sides of the axial direction to rotor axis 1 (FIG. 1), and rotor axis retainer 11 is bolted from both sides of the axial direction to a pair of reinforced retainers 1a using a bolt and nut 25, or other means for securing the means for retaining the means for rotating the permanent magnet to the rotor axis, that inserts through holes 11a to fix the rotor axis to rotor 2. A pair of reinforced retainers 1a is integrated with rotor axis 1. As shown in FIG. 3, reinforced retainers 1a have a conical structure such that the axial direction thickness increases when it comes closer to rotor axis 1 and decreases when it comes closer to the permanent magnet 12. The circumferential contact area of the rotor component is connected with an adhesive member "A" of lower rigidity (such as adhesives) than the rotor component and permanent magnet 12.

Figure 5:
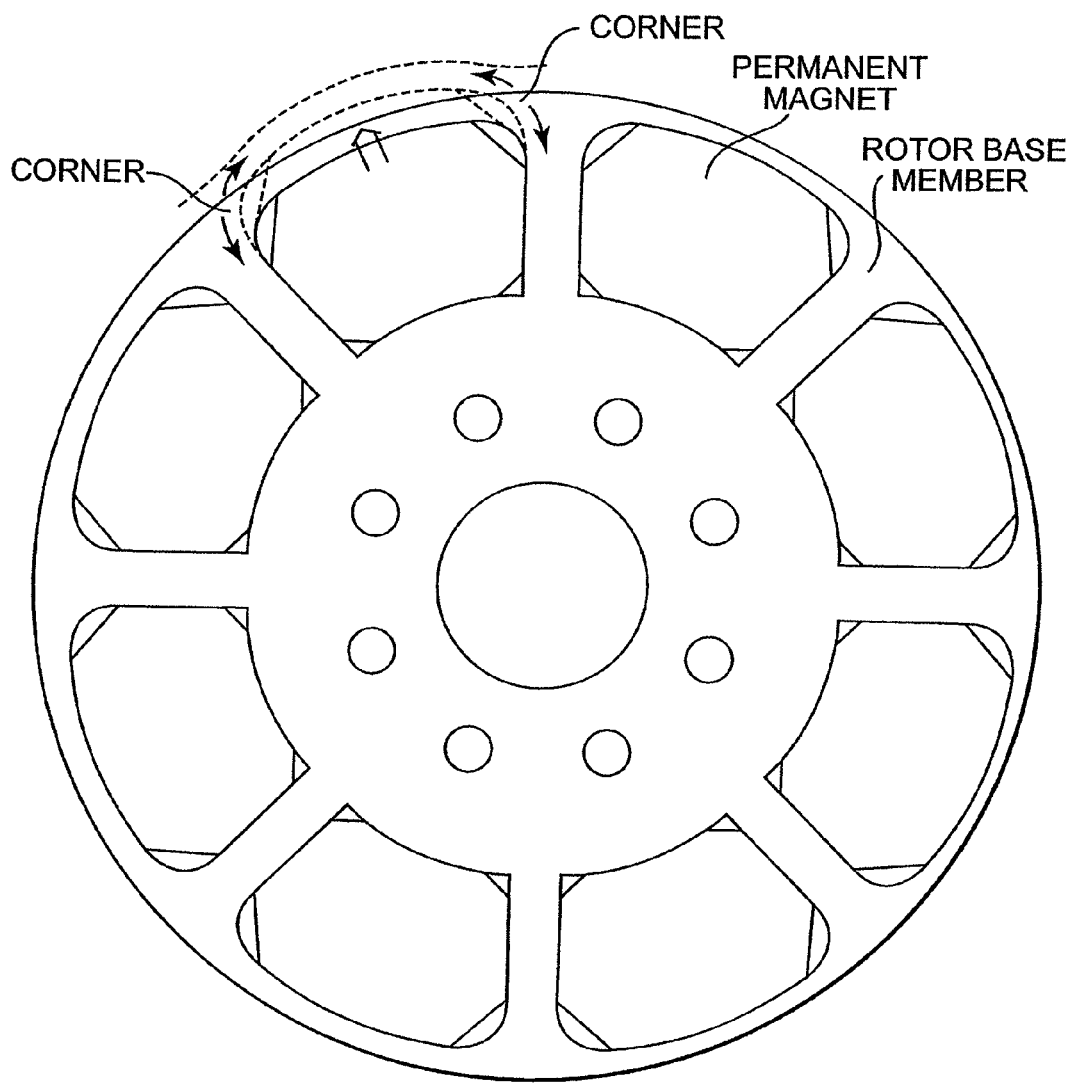
FIG. 5 is an illustration that shows a variant mechanism of a rotor base member at the rotor revolution of a conventional axial gap rotating electrical device.

For comparison purposes, FIG. 5 illustrates an example of an earlier technology rotor of an axial gap rotating electrical device. In the example of FIG. 5, a rotor base member is used as a reinforced member. The reinforced rotor base member forms the framework and has holes for attaching magnets, where each hole holds a permanent magnet attached by an adhesive joint.

When the centripetal force generated on the permanent magnet with an independent mass acts on the outer circumference of the rotor base member, as shown by the dotted line in FIG. 5, stress concentrations occurs at the corner of the rotor base member corresponding to both of the outer circumferential corners of the permanent magnet. This causes distortion of the outer circumference towards the outside diameter. With the rotor base member following the same curvature throughout the rotor, it may be essential to optimize the curvature radius at the corner and check the component strength for reducing the stress concentration.

CFRP and other similar materials may be used for high stress applications, featuring high strength and low density. However, for a configuration having several holes for attaching magnets in the round rotor base member as shown in FIG. 5, it is difficult to evenly place the carbon-fiberglass, and the CFRP's original high-strength property in the direction of fiberglass is not fully effective to control stress concentrations.

In the rotor structure of the axial gap rotating electrical device as shown in FIG. 4, which is in contrast to that illustrated in FIG. 5, rotor 2 includes a round member formed by radially combining several rotor components that radially envelop the outer circumference of the permanent magnet 12. Rotor axis retainer 11 is placed within permanent magnet 12 using high-strength member 24.

Since the outer circumference of the individual permanent magnet 12 may be reinforced with high-strength member 24, permanent magnet 12 suffers less damage at installation. In addition, the centripetal force, which acts on permanent magnet 12 by during rotation of rotor 2, may be dispersed as tensile stress on the radial direction part of high-strength member 24 that radially envelops each permanent magnet 12. As a result, a reduction in damage to permanent magnet 12 at installation is reached, as well as achieving higher rotational speed by providing sufficient rotational strength.

The centripetal force generated on permanent magnet 12 by the rotation of rotor 2 acts on high-strength member 24 that envelops the outer circumference of the rotor components. The force is also transmitted to rotor axis retainer 11 via high-strength member 24, where it is supported by rotor axis 1 by passing using bolt and nut 25 through the holes 11a to hold the rotor axis created in the rotor axis retainer 11.

Figure 6:
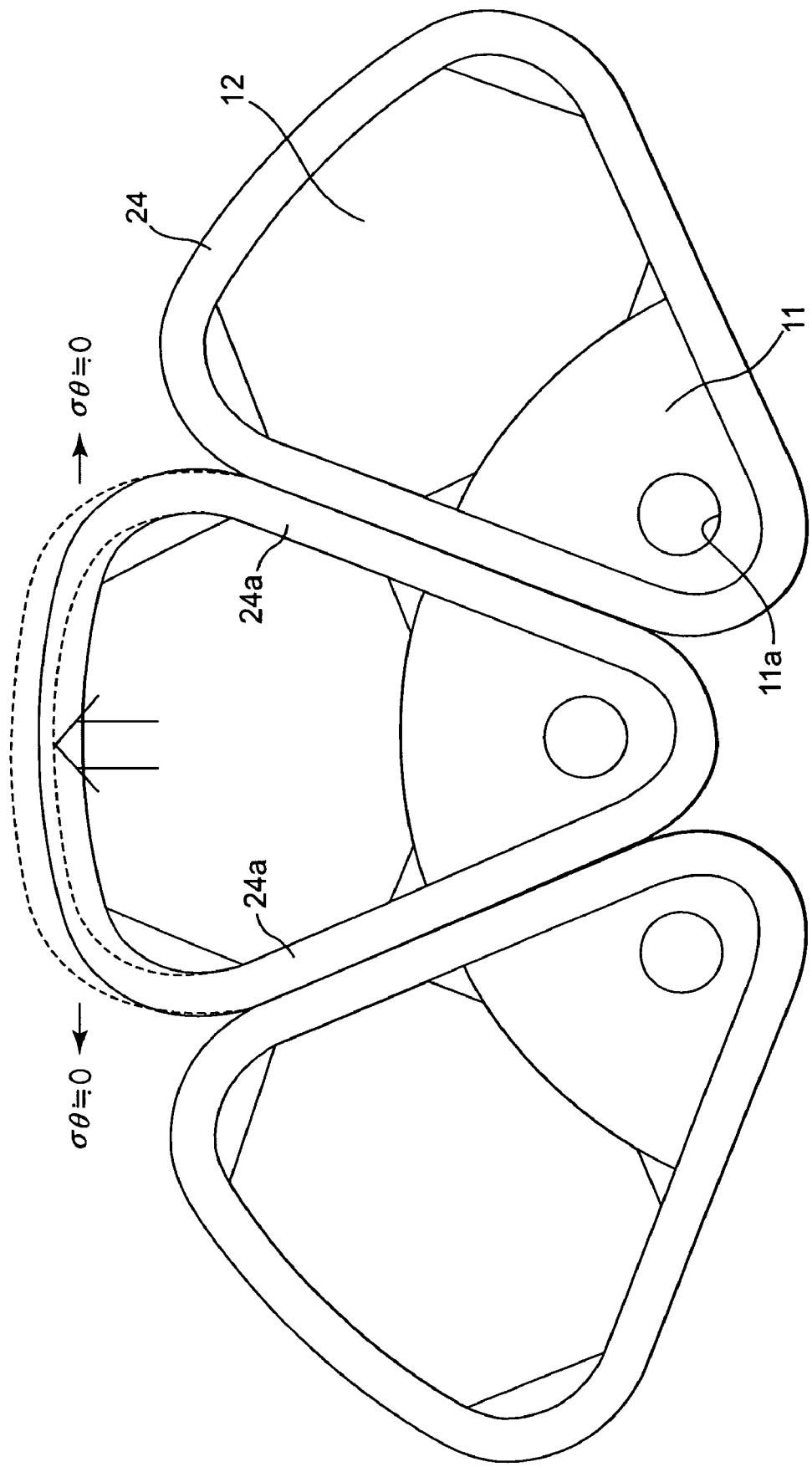
FIG. 6 is an illustration that shows a variant mechanism of the rotor components at the rotor revolution of the axial gap rotating electrical device of FIG. 1.

In contrast to the earlier technology of FIG. 5, FIG. 6 shows high-strength member 24 distorted toward the outer diameter due to the action of centripetal force on permanent magnet 12. The force is not transmitted between the adjacent rotor components. Therefore, the stress concentration is relieved in comparison with the stress generated by corner expansion that occurs in FIG. 5. However, since the hoop around the outer circumference does not inhibit the distortion as shown in the rotor structure of FIG. 5, the force to be shared by the radial direction parts 24a of high-strength member 24 increases, which causes further distortion. Furthermore, in this case, the radial direction parts 24a of high-strength member 24 do not become the weakest points due to tension distribution.

High-strength member 24 has an even wall thickness and a continuous cyclic shape that enables easy formation with carbon fiberglass. In addition, the load is directed close to the continuous fiber-glass, which allows full use of the material strength.

Furthermore, in the rotor structure of the axial gap rotating electrical device of FIG. 4, the circumferential contact area of the rotor component is connected with the rotor component and an adhesive member "A" of lower rigidity than permanent magnet 12 (such as adhesives). Therefore, considering each rotor component in comparison with the rotor structure shown in FIG. 5, in which the rotor base member is integrated, the possible radial acceleration is decreased because the mass is small. As a result, greater rotational speed may be obtained when utilizing a curved high-strength member 24.

The first embodiment shown in FIGS. 1-4 and 6 allows rotor 2 to achieve higher rotational speeds while retaining permanent magnet 12. In addition, since high-strength member 24 may be composed of a filament winding method for carbon fiber-glass and Kevlar rather than a solid method (such as pure iron), these higher speeds may be possible.

High-strength member 24 comprises a continuous fiber reinforced plastic in a partially circular shape, which may look similar to a triangle. This shape may allow high-strength member 24 to bear the centripetal force on the permanent magnet 12 as a high-strength directional load for the continuous fiber reinforced plastic. As a result, high-speed rotation is made possible. In addition, the nonmetal structure allows suppression of the reduction in efficiency due to flux leakage and eddy-current loss.

Rotor 2 may be fixed to rotor axis 1 with high strength. Rotor 2 comprises a round member formed by radially combining several rotor components, and since the rotor axis retainer 11 was placed in the inner circumference of said permanent magnet 12, a hole 11a is used to fix the rotor axis to rotor axis retainer 11. A pair of reinforced retainers 1a which secure rotor axis retainer 11 from both sides of the axial direction are fixed to rotor axis 1. Rotor axis retainer 11 is fixed to the pair of reinforced retainers 1a from both sides of the axial direction using bolt and nut 25 that is inserted through holes 11a to hold the rotor axis.

Since the circumferential contact area of the rotor component is attached to an adhesive member with lower rigidity than the rotor component and the permanent magnet, further improvement can be expected in the rotation speed able to be achieved.

Figure 7:
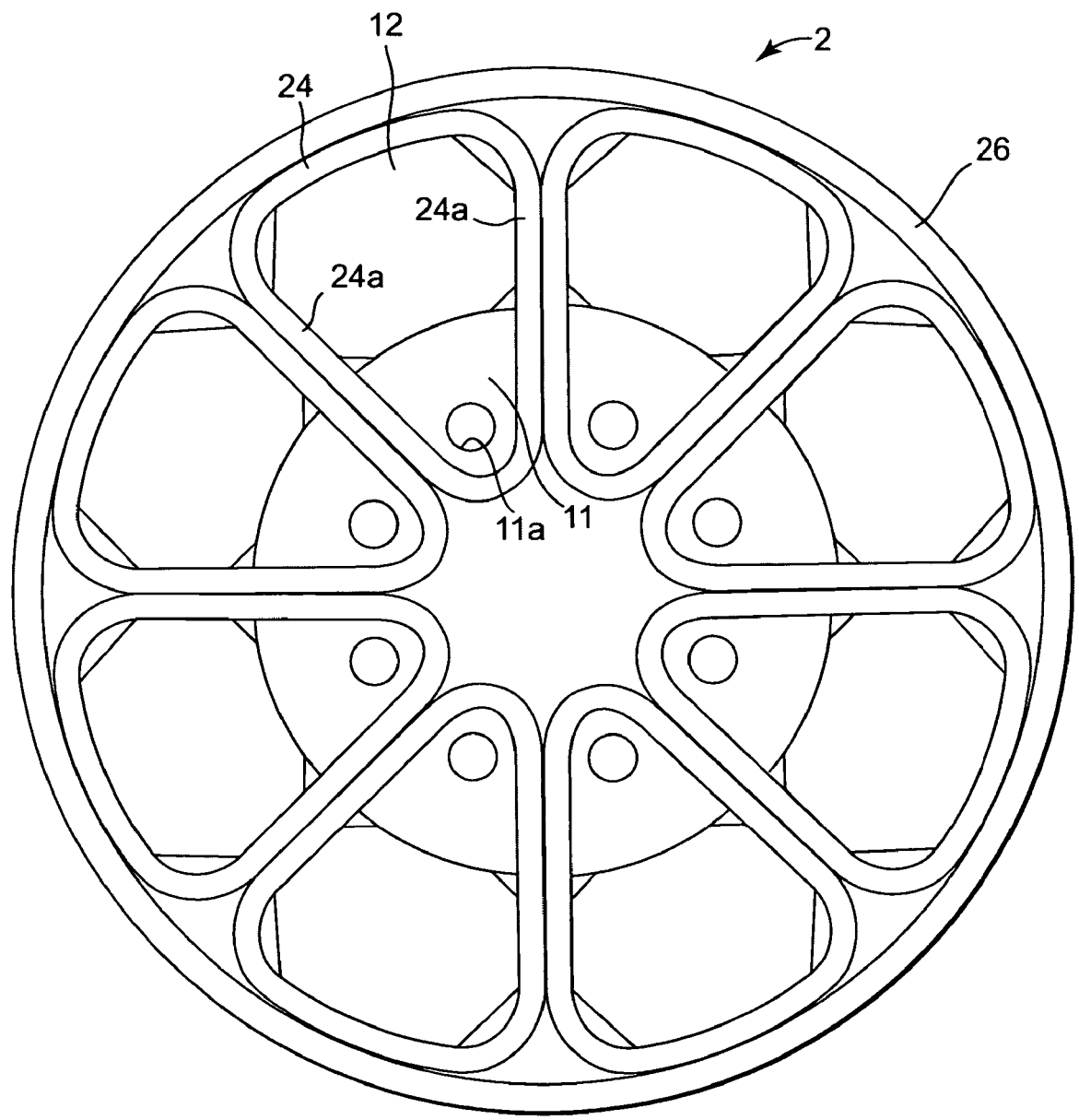
FIG. 7 is a front view that shows an exemplary second embodiment of a rotor of the axial gap rotating electrical device.

FIG. 7 illustrates a second embodiment in which a toric member has been added to the outer circumference of rotor 2. That is, for the rotor structure of the axial gap rotating electrical device as shown in FIG. 7, rotor 2 includes a round member formed by radially combining several rotor components and a toric member 26 placed on the outer circumference of the round member. It is possible to form toric member 26 by bonding or pressing a previously formed toric member with high-strength materials including carbon fiber-glass or Kevlar. Toric member 26 may also be formed by winding a high-strength fiber including carbon fiber-glass or Kevlar after creating a disk-like core. The circumferential contact area of the rotor components may slide without being attached to each other. In other aspects, FIG. 7 is similar to FIG. 4.

The rotor structure of the embodiment shown in FIG. 7 has toric member 26 on the outer circumference of the round member. The centripetal force on each permanent magnet 12 derived from the rotation of rotor 2 may be shared with high-strength member 24 and toric member 26. Therefore, the force shared by radial parts 24a of the high-strength member 24 becomes lower than that of FIG. 4, which does not have the toric member 26. The structure of FIG. 7 may allow greater rotational speed relative to conventional rotor structures. The force on toric member 26 is in tension along the outer circumference of the round member.

In addition, the contact area of toric member 26 on the outer circumference of high-strength member 24 is slidable without being attached. This is because toric member 26 is created on the outer circumference for the round member that allows the toric member 26 to hold the rotor shape. Consequently, taking the individual rotor component into consideration, the specific frequency increases due to the small mass, in contrast to the earlier technology rotor structure shown in FIG. 5 where the rotor base member is unified. Therefore, further increases in rotational speed and attenuation rate of the rotor structure may be possible, caused by radial sliding between adjacent high-strength members 24.

Rotor 2 of FIG. 7 comprises a round member formed by radially combining several rotor components and toric member 26 created on the outer circumference of the round member. This embodiment may be capable of higher rotational speeds as compared to the first embodiment shown in FIG. 4.

Figure 8:
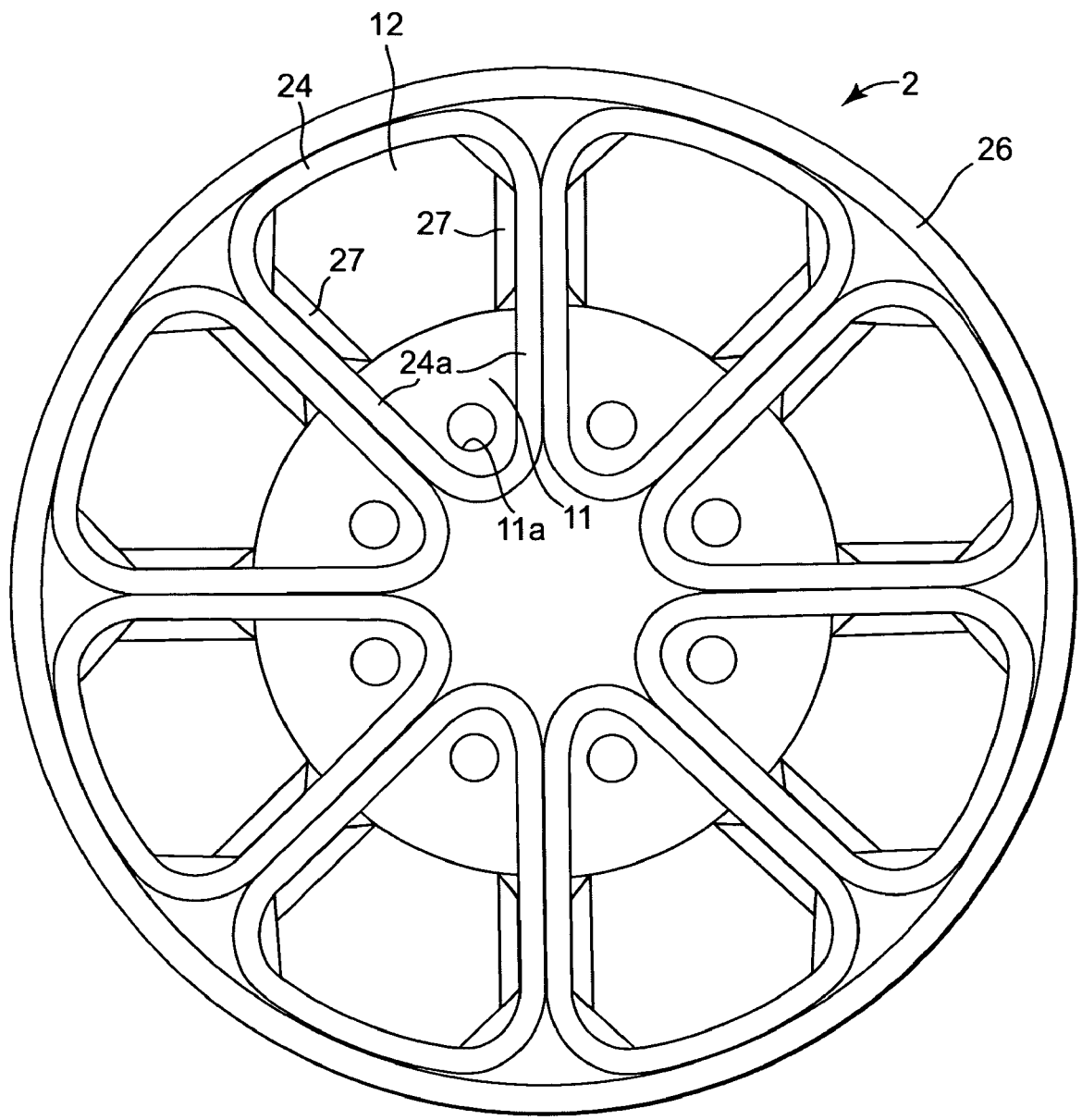
FIG. 8 is a front view that shows an exemplary third embodiment of a rotor of the axial gap rotating electrical device similar to FIG. 7.

An additional embodiment of rotor 2 is shown in FIG. 8. FIG. 8 illustrates a rotor structure in which a soft magnet is placed on both of the circumference surfaces of each permanent magnet 12. The rotor structure of the axial gap rotating electrical device, in this embodiment, has means for passing flux but including no coercivity, and soft magnets 27, which pass flux but have no coercivity. Both circumferential surfaces of each permanent magnet 12 include soft magnets 27 placed in rotor components. Soft magnets 27 are fixed to permanent magnet 12. Other structures of FIG. 8 are similar to FIG. 7. As for the mechanism, by placing soft magnets 27 in rotor 2, reluctance torque is made possible along with magnet torque when implanting permanent magnets within rotor 2 for the radial gap rotating electrical device.

FIG. 8, therefore, includes soft magnets 27, which pass flux but have no coercivity, equipped on both of the circumference surfaces of each permanent magnet 12 placed in the said rotor components. Reluctance torque is made possible, and soft magnets 27 may be kept together with permanent magnet 12 by the high-strength member 24 and toric component 26. As a result, improvement in torque and an increase in rotation speed may be possible.

Figure 9:
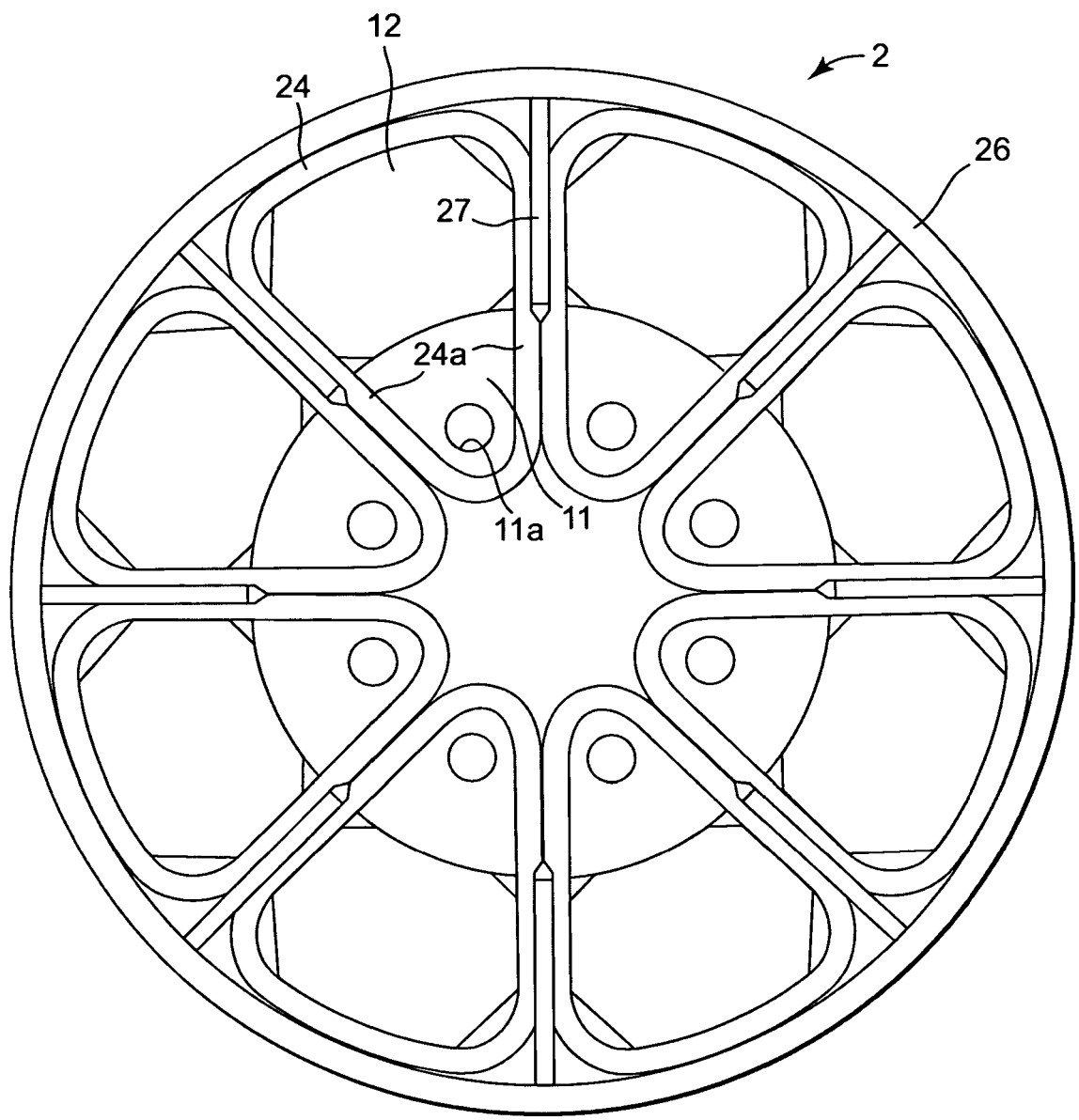
FIG. 9 is a front view that shows an exemplary third embodiment of a rotor of the axial gap rotating electrical device.

FIG. 9 shows a fourth embodiment of a rotor structure in which a soft magnet is placed in the middle point where the adjacent rotor components meet. This may be an alternative to the rotor structure shown in FIG. 7. In other words, the rotor structure of the axial gap rotating electrical device embodiment shown in FIG. 9 includes a soft magnet 27, which passes flux but has no coercivity, is placed at the middle point where adjacent rotor components meet. Soft magnets 27 may also contact toric member 26 in the radial direction. Soft magnet 27 may be retained with toric member 26 and fixed together with permanent magnet 12. Placing soft magnet 27, as shown in FIG. 9, may help to improve the torque so that reluctance torque can be used in addition to magnet torque. Furthermore, cogging torque is reduced due to the smooth flux variation.

Soft magnet 27, which passes flux but has no coercivity, is placed at the middle point where adjacent rotor components meet in the opposite circumferential direction. Soft magnets 27 also contact toric member 26 in a radial direction. Torque improvement may be enabled by the use of reluctance torque, and it is also possible to reduce flux leakage from the soft magnet 27 part because permanent magnet 12 and soft magnet 27 do not directly contact each other. Furthermore, as flux varies with stators 3 (shown in FIG. 1) smoothly performed by soft magnet 27, the soft magnet reduces cogging torque.

As described above, the rotor structure of the axial gap rotating electrical device is described in several different embodiments. However, the claimed structures are not limited to these embodiments. Variations of these embodiments are possible, as these embodiments provided in the FIGS. are exemplary embodiments.

For example, in addition to the structures described FIGS. 1-9, it is possible to place a thin plate or a sheet-like continuous fiber fabric on one or both sides of the round member (including the toric member and others). In this case, in addition to higher rotational speeds, the following features may be improved. Dimensional accuracy in the axial direction of the permanent magnet, shatter resistance of the permanent magnet, and rigidity of the rotor structure may be improved.

In summary, as discussed above, FIG. 4 illustrates an example of a round member of rotor 2 in which the circumferential contact area of the rotor component is connected using an adhesive member of lower rigidity (such as adhesive agents) than the rotor component and the permanent magnet. FIGS. 6-9 illustrate examples of alternative embodiments of round members of rotor 2 in which the circumferential contact area of the rotor components are made slidable without attaching the components. It is also possible to secure the circumferential contact area.

Moreover, FIG. 4 illustrates an example of integrating a pair of reinforced retainers with the rotor axis. It is also possible to create one or both of the pair of the reinforced retainers separately from the rotor axis and fix the distinct reinforced retainer to the rotor axis with other structures.

Thus, the embodiments shown in FIGS. 4, and 6-9 are examples of alternative embodiments of round members of rotor 2 having an axial air gap between the rotor and the stator as an axial gap rotating electrical device. It is also applicable to an axial gap rotating electrical device, for example, in which there is only an axial gap made up of an oil film in place of an air gap between the rotor and the stator.

The axial gap rotating electrical device described in embodiments of FIGS. 4 and 6-9 may be applied as an axial gap motor as well as an axial gap generator. In addition, these embodiments represent examples of a 1 rotor and 2 stators axial gap rotating electrical device. The disclosure is also applicable to the axial gap rotating electrical device, which has a different number of stators and rotors from the description in the embodiments, such as an axial rotating electrical device with 1 rotor and 1 stator, 2 rotors and 1 stator, 2 rotors/2 stators, and so on.

Some embodiments described herein may provide certain advantages. Securing a permanent magnet with a round member capable of high stress resistance may allow the rotor to rotate at higher speeds than other rotors without the round member described herein. In addition, other embodiments may provide a further toric member that encompasses the rotor to aid in the distribution of stresses on round members of the rotor that occur during high rotational speeds. The embodiments described herein may be manufactured at a facility to conform the description of each figure.

Various embodiments of the invention have been described. However, the present disclosure is not limited to the embodiments described herein. These and other embodiments are within the scope of the following claims. Embodiments including modifications or changes are applicable to the extent of operation and description of the disclosure.

The invention claimed is:

1. An axial gap rotating electrical device comprising:
   a stator having a stator core and a stator coil; and
   a rotor disposed in an axial direction with respect to the stator, the rotor including
   a plurality of permanent magnets circumferentially arranged and facing the stator core,
   a plurality of high strength members each enveloping an entire circumference of a corresponding one of the permanent magnets and being configured to prevent a centripetal force on the corresponding one of the permanent magnets from being transmitted between adjacent ones of the high-strength members during a rotation of the rotor,
   a plurality of rotor axle retainers with each of the rotor axle retainers having a hole for attaching to a rotor axle, each of the rotor axle retainers being a separate piece and being disposed exclusively radially inward of each of the permanent magnets, and
   a pair of reinforced retainers attached to the rotor axle in order to secure the rotor axle retainers from both sides of an axial direction of the rotor axle, each of the rotor axle retainers being attached on both sides of the axial direction to the reinforced retainers by an axial direction fixation mechanism inserted through the holes to fix the rotor axle retainers to the rotor axle.

2. The axial gap rotating electrical device of claim 1, wherein
   each of the high-strength members is made of reinforced plastic and continuous fiberglass formed in a partially curved shape.

3. The axial gap rotating electrical device of claim 1, wherein
   circumferential contact areas of the permanent magnets are attached with an adhesive member with lower rigidity than the permanent magnets.

4. The axial gap rotating electrical device of claim 1, further comprising
   a toric member placed on an outer circumference of the permanent magnets that are circumferentially arranged.

5. The axial gap rotating electrical device of claim 4, wherein
   the toric member is slidably attached on the outer circumference of the permanent magnets.

6. The axial gap rotating electrical device of claim 5, wherein
   a soft magnet is placed at a middle area of the permanent magnets circumferentially adjacent each other and at a contact area radially contacting with the toric member, the soft magnet passing flux with low coercivity.

7. The axial gap rotating electrical device of claim 1, wherein
   a soft magnet is placed on both circumferential surfaces of each of the permanent magnets, the soft magnet passing flux with low coercivity.

8. An axial gap rotating electrical device comprising:
   rotating means for rotating permanent magnets with respect to a stator about a rotational axis;
   placing means for placing the rotating means and a stator core of a stator so as to face each other in an axial direction of the rotational axis;
   securing means for radially securing each of the permanent magnets arranged in a circumferential direction about the rotational axis to form a plurality of high-strength members each being a continuous one-piece structure enveloping an entire circumference of a corresponding one of the permanent magnets,
   the permanent magnets and the high-strength members forming a plurality of separate rotor components circumferentially arranged as separate members so that a centripetal force on each of the permanent magnets is prevented from being transmitted between adjacent ones of the high-strength members during the permanent magnet rotation;

retaining means for retaining the rotating means about a rotor axle disposed along the rotational axis, the retaining means forming a plurality of rotor axle retainers with each of the rotor axle retainers having a hole for attaching to the rotor axle, each of the rotor axle retainers being a separate piece and being disposed exclusively radially inward of each of the permanent magnets; and securing means for securing the retaining means to the rotor axle, the securing means forming a pair of reinforced retainers attached to the rotor axle in order to secure the rotor axle retainers from both sides of an axial direction of the rotor axle, each of the rotor axle retainers being attached on both sides of the axial direction to the reinforced retainers by an axial direction fixation means inserted through the holes for fixing the rotor axle retainers to the rotor axle.

9. The axial gap rotating electrical device of claim 8, further comprising soft magnetic means for passing flux with low coercivity, the soft magnetic means being placed on both circumferential surfaces of each of the permanent magnets.

* * * * *